US012754094B2

(12) United States Patent
Cobb et al.

(10) Patent No.: US 12,754,094 B2
(45) Date of Patent: Oct. 6, 2026

(54) SYSTEM FOR MONITORING THE INTEGRITY OF A ROOF

(71) Applicant: RAM Companies, LLC, St. Paul, MN (US)

(72) Inventors: Joseph C. Cobb, Medina, OH (US); Jeffrey Cacioppo, Medina, OH (US)

(73) Assignee: RAM Companies, LLC, St. Paul, MN (US)

( * ) Notice: Subject to any disclaimer, the term of this patent is extended or adjusted under 35 U.S.C. 154(b) by 238 days.

(21) Appl. No.: 18/789,297

(22) Filed: Jul. 30, 2024

(65) Prior Publication Data

US 2024/0393202 A1 Nov. 28, 2024

Related U.S. Application Data

(63) Continuation of application No. 17/286,862, filed as application No. PCT/US2019/057337 on Oct. 22, 2019, now Pat. No. 12,072,263.

(60) Provisional application No. 62/751,317, filed on Oct. 26, 2018.

(51) Int. Cl.
*G01M 3/04* (2006.01)
*G01K 13/00* (2021.01)

(52) U.S. Cl.
CPC ............... *G01M 3/04* (2013.01); *G01K 13/00* (2013.01)

(58) Field of Classification Search
CPC ................................. G01M 3/04; G01K 13/00
See application file for complete search history.

(56) References Cited

U.S. PATENT DOCUMENTS

| | | | | |
|---|---|---|---|---|
| 4,565,965 | A * | 1/1986 | Geesen | E04D 15/00 324/705 |
| 4,598,273 | A * | 7/1986 | Bryan, Jr. | E04D 13/006 73/304 R |
| 5,193,390 | A * | 3/1993 | Nill, Jr. | G01M 3/16 73/335.02 |
| 6,040,775 | A * | 3/2000 | Nill, Jr. | E04D 13/006 340/602 |
| 10,458,877 | B1 * | 10/2019 | Fulton | G01M 3/16 |
| 10,519,664 | B1 * | 12/2019 | Gunness | G01M 3/16 |
| 2003/0167826 | A1* | 9/2003 | Holt | G01M 3/26 73/40 |
| 2014/0361796 | A1* | 12/2014 | Vokey | E04D 13/006 324/693 |
| 2017/0097276 | A1* | 4/2017 | Gunness | G01N 27/20 |
| 2018/0202163 | A1* | 7/2018 | Vokey | G01D 5/165 |
| 2023/0066225 | A1* | 3/2023 | Vokey | G01M 3/04 |
| 2024/0077645 | A1* | 3/2024 | Cobb | G01W 1/02 |

* cited by examiner

*Primary Examiner* — Eric S. McCall
(74) *Attorney, Agent, or Firm* — Todd R. Fronek; Larkin Hoffman Daly & Lindgren, Ltd.

(57) ABSTRACT

It is disclosed herein a system for monitoring the integrity of a roof. The system comprises a plurality of monitoring devices. Each monitoring device may comprise at least one power supply, a sensor comprising at least one detection device, a shroud at the end of a conduit which is in sealed fluid communication with the inside of a roof assembly, a motivating source, a central processor, and a receiver.

20 Claims, 2 Drawing Sheets

SYSTEM FOR MONITORING THE INTEGRITY OF A ROOF

CROSS REFERENCES AND PRIORITIES

This Application claims priority from U.S. Provisional Application No. 62/751,317 filed on 26 Oct. 2018, PCT Application No. PCT/US19/57337 filed 22 Oct. 2019, and U.S. application Ser. No. 17/286,862 filed 20 Apr. 2021, the teachings of each aforementioned application are hereby incorporated by reference herein in their entirety.

BACKGROUND

Membrane and Multiply roof systems are commonly used in low-slope and steep-slope roofs. A membrane roof typically comprises a rubber, asphalt, or plastic (e.g., made of PVC) sheet that provides a moisture and vapor barrier. Membrane roofs are relatively inexpensive to install and consequently the use of membrane roof systems has been expanding in recent years.

One problem with roofs is that it is very hard to detect the conditions of the roof on a real time basis.

One of the challenges of designing roof systems is providing a detection system which alerts one to the loss of moisture integrity (i.e. a leak).

Current systems rely upon an electric grid placed in the roof assembly. However, a grid requires the moisture to migrate to the wires and often fails when the wires are crimped or cut.

The need exists, therefore, for an apparatus and system for membrane roofs which monitors the roof assembly for internal moisture which is more reliable and more quickly responsive than traditional electric grids.

SUMMARY

A system for monitoring the integrity of a roof is disclosed. The system may comprise a plurality of monitoring devices. Each monitoring device may comprise at least one power supply, a sensor comprising at least one detection device, a shroud at the end of a conduit, a motivating source, a central processor, and at least one receiver. Each detection device may be independently capable of detecting at least one parameter. The conduit may be in sealed fluid communication with the inside of the roof assembly. The motivating source may be configured to pass air from the inside of the roof assembly through the conduit to the detection device of the sensor and expel said air to atmosphere. The central processor may be configured to receive an input from the sensor and communicate the input to the at least one receiver. The at least one receiver may be selected from the group consisting of a different monitoring device, and a centralized device which is not part of the monitoring device. The input may correspond to the detection of the at least one parameter.

In some embodiments, the at least one parameter is selected from the group consisting of moisture, barometric pressure, volatile organic compounds, electrostatic charge, motion of the roof, motion on the roof, vibration, heat, and off gases generated from roof material decay.

In some embodiments, the power supply may be selected from the group consisting of solar, wind, battery, or hard wires to an electric grid.

In some embodiments, the motivating source may be selected from the group consisting of a venturi system, a fan, and an impeller.

In some embodiments, the centralized device may be a computer or a security system.

In some embodiments, the system may further comprise an external temperature device to measure the external temperature and communicate the measurement to the receiver.

In some embodiments, the plurality of monitoring devices may be configured in a mesh network.

DETAILED DESCRIPTION

Figure 1:
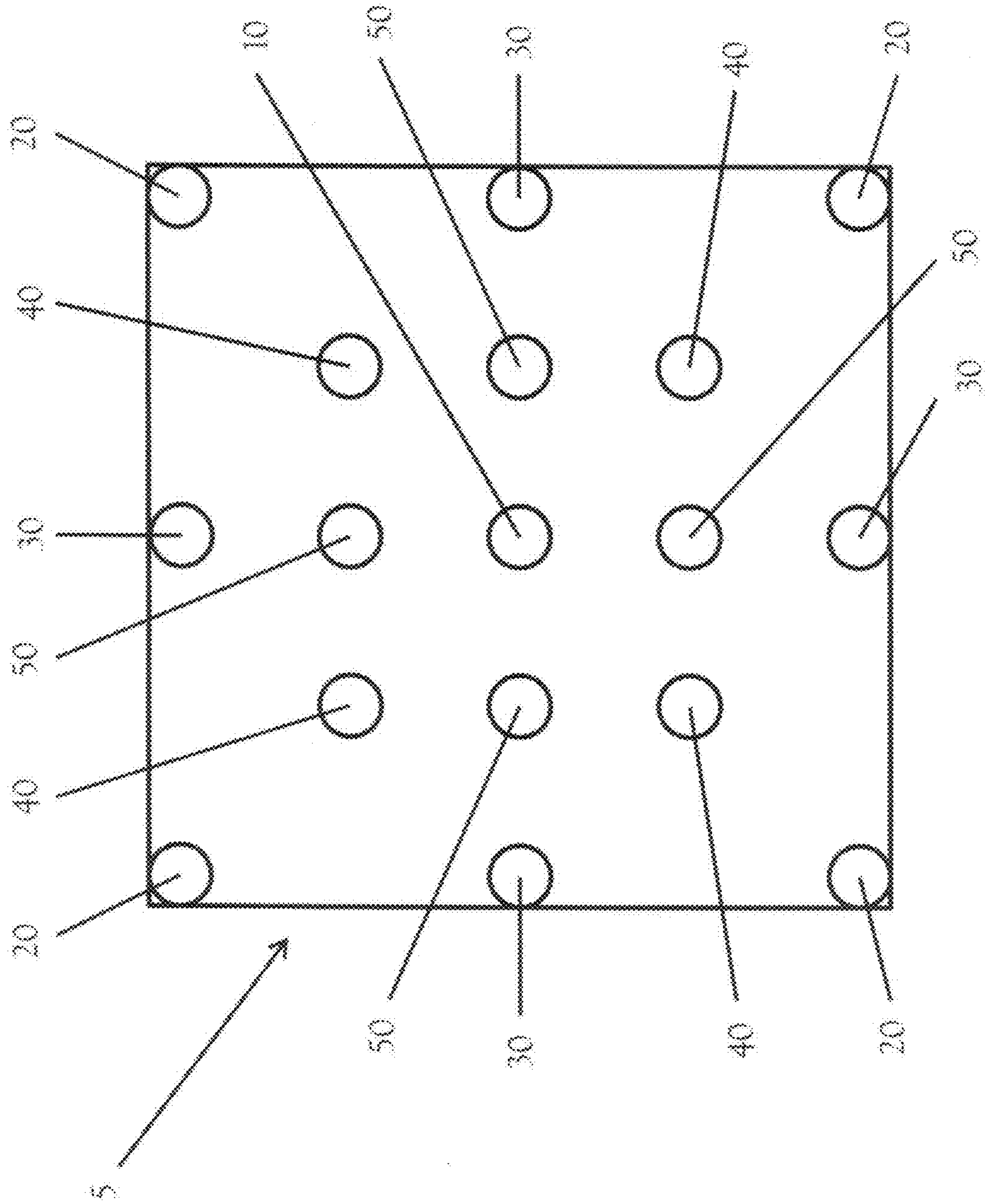
FIG. 1 is a top view of one embodiment of a roof comprising the roof monitoring system.

Disclosed herein is a roof monitoring system for detecting moisture in a roof assembly. Once constructed the system can be used to monitor the roof conditions in real time and monitor the elements to which the roof is exposed and where that exposure is occurring on the roof.

More specifically the system has a plurality of monitoring devices placed throughout the surface of the roof. Each monitoring device comprises at least one power supply, and a sensor comprising at least one detection device. Using moisture detection as an example, these detection devices are capable of detecting moisture in a gas passing across the detection device. The more sophisticated detection device will measure moisture concentration (humidity). When integrated with a data logger that keeps track of the measurements with time, the trends in moisture or humidity values can be determined.

Because the monitoring devices are placed in various areas around the roof, the detection device(s) allow one to locate which area of the roof has a higher moisture level than others.

The problem however is to measure the inside of the roof assembly, and not the outside of the roof. This is accomplished by the use of a conduit which is sealed (does not leak gas or liquid at Standard Temperature and Pressure) and fluidly connects and communicates with the inside of the roof assembly (inside of the roof membrane) with the top of the roof.

A motivating source can be configured to pass air from the inside of the roof assembly to the atmosphere. For example, a fan placed at the exterior opening of the conduit on the exterior side of the roof membrane can be configured to pull vapors from the other side (inside) of the roof membrane, a conditioned air source, a nitrogen air source, and/or air from inside the facility and move them through the conduit to be expelled into the atmosphere.

Alternatively, the fan could be placed at the interior opening of the conduit on the interior side of the roof membrane and push the vapors into the conduit to be expelled into the atmosphere.

Alternatively, the fan could be located inside the conduit and configured so that the low pressure side of the fan is oriented towards the roof assembly and the high pressure side of the fan is oriented to the atmosphere thus pulling the vapors from inside the roof assembly and pushing them to the exit to be expelled into the atmosphere.

Alternative motivating sources to a fan exist. Such motivating sources may be a venturi system, or an impeller.

The motivating force may use a power supply, which could be solar, wind, microwave, hardwire connection to a battery, or to the electric grid. This same power supply could be used to power a detection device described next. Alternatively, the motivating force may be passive and rely on the thermal changes (adiabatic) in the surrounding environment, the pressure differentials of barometric changes, and/or be induced by a venturi system.

Once there is a conduit from the inside of the roof assembly to the roof, a detection device may be configured to the conduit so as to detect a parameter of the vapors. This configuration could be either in the conduit or at the exit or entrance of the conduit. The location preference depends upon the user's preference and which location gives the most accurate reading. For example, while placing the detection device three feet away from the conduit exit will give a reading, it will be only partly reflective of the moisture value inside the roof assembly as the atmospheric air will have a chance to alter the results. On the other hand, a detection device inside the conduit or directly at the exit will be much more reflective of the actual moisture value.

The detection device may also need a power supply as described herein. The preferred power supply is solar or wind supplying a battery.

One example of a conduit is disclosed in U.S. Pat. No. 7,001,266 (the "'266 Patent"), the teachings of which are incorporated herein by reference in their entirety. The '266 Patent teaches "a roof vent and roof system that reduces air pressure under a membrane roof when wind blows, thereby holding down the membrane roof. The present roof vent employs the Venturi effect to reduce the pressure under the membrane." The roof vent solution proposed in the '266 Patent is a separate component attached to the membrane roof.

The roof vent disclosed in the '266 Patent forms a sealed conduit in fluid communication with the inside of the roof assembly, or the internal side of the roof membrane. The inside of the round ball at the top of the assembly forms a shroud which is at the end of the conduit.

These roof vents (i.e. sealed conduits) could be modified or retrofitted to include the roof monitoring system disclosed herein.

Figure 2:
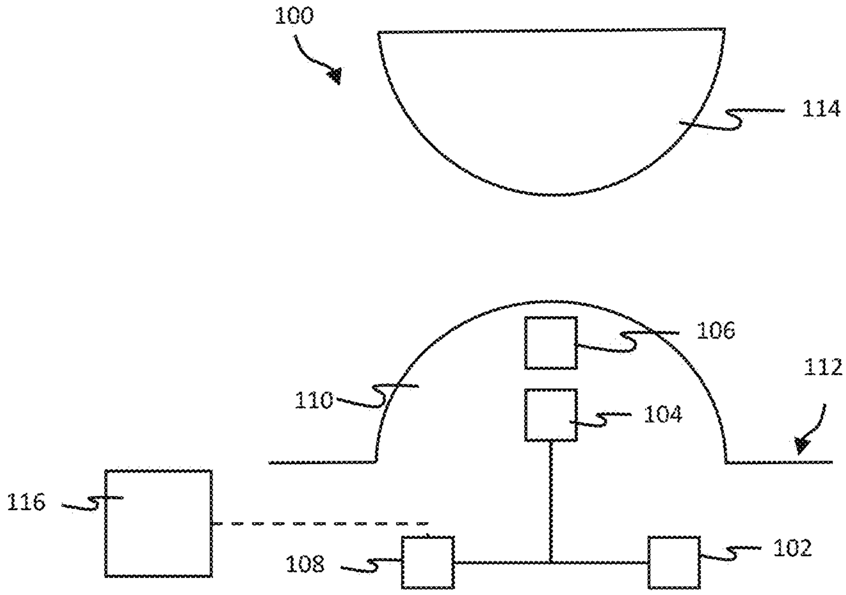
FIG. 2 is a schematic view of a monitoring device.

FIG. 2 is an example view of a monitoring device 100, including a power supply 102, sensor 104, motivating source 106 and central processor 108. A lower portion of a roof vent forms a sealed conduit in fluid communication with an inside of a roof assembly 112. An upper portion 114 of the roof vent forms a shroud positioned at the end of the conduit. The power supply 102 powers the sensor 104, which includes a detection device independently capable of detecting at least one parameter as discussed herein. Motivating source 106 is configured to pass air from the inside of the roof assembly 112 through the conduit to the sensor 103 and expel the air to atmosphere. Central processor 108 is configured to receive input from the sensor 104 and communicates the input to at least one receiver of a different monitoring device and a centralized device 116.

Once installed the roof monitoring system disclosed herein communicates the input from the sensor to a central processor for communication to at least one receiver selected from the group consisting of a different monitoring device, and a centralized device which is not part of the monitoring device for data logging, display, analytical, and triggering events. The centralized device may be a computer or a security system. The input communicated to the central processor may correspond to the detection of at least one parameter.

The input may be communicated to the central processor by a variety of different communication methods. Specific non-limiting examples of such communication methods include wireless internet communication, blue tooth, near-field communication (NFC) protocol, wireless mobile telecommunication (i.e.—3G, 4G, or 5G), wired network communication (i.e.—Cat5, Cat5e, or Cat6 cable), and fiberoptic communication.

Again, assuming only humidity detection devices are used. Experience will tell how many to use and the configuration across the roof. However, assuming the roof (5) was a square, one arrangement may be to place the detection devices at the center (10), the corners (20), the center point of each side (30), and part way in between a line passing from each corner (40) and/or center point of a side (50) to the center as shown in FIG. 1.

A background moisture may be 35%, reflective of ambient conditions. However, assuming the monitor in the far right corner spikes to 75%. This would indicate a leak close by. The concentration of the moisture increasing over time relative to itself or to the other monitors can be used to pinpoint the leak location as it will be at the location triangulated by three monitoring devices.

Some of the parameters that can be detected and/or measured are water/moisture, barometric pressure, volatile organic compounds, carbon monoxide, carbon dioxide, heat/temperature, and electrostatic charges, motion of the roof, motion on the roof, vibration, and off gases generated from roof material decay.

In some embodiments, the system may further comprise an external sensor for detecting measurement of one or more of the parameters disclosed herein (i.e. water/moisture, barometric pressure, volatile organic compounds, carbon monoxide, carbon dioxide, heat/temperature, electrostatic charges, etc.). One example of an external sensor is an external temperature device, such as a thermometer. The external temperature device may measure the external (i.e. atmospheric) temperature surrounding the structure, and communicate the measurement to the centralized device. This external temperature device is separate from a device which detects heat/temperature in the membrane roof system, as the external temperature device only detects heat external to the membrane roof system. When used, the external sensors surrounding the structure may be used as a baseline for calculating changes by comparing a measurement parameter detected by a detection device to the external sensor.

In some embodiments, the plurality of monitoring devices may be configured in a mesh network allowing the monitoring devices to communicate to one another.

What is claimed is:

1. A method for monitoring roof integrity, comprising:

positioning a plurality of monitoring devices throughout a roof, each monitoring device comprising a power supply, at least one detection device, a conduit, a shroud at one end of the conduit, a motivating source and a central processor;

for each of the plurality of monitoring devices, passing air using the motivating source from inside of a roof assembly of the roof through the conduit to the at least one detection device and expelling said air to atmosphere;

configuring at least one of the plurality of monitoring devices to communicate an input received to its respective central processor to a receiver of a different monitoring device of the plurality of monitoring devices, said input corresponding to detection of at least one parameter detected by a corresponding detection device; and configuring at least one of the plurality of monitoring devices to communicate an input received to its respective central processor to a receiver of a centralized device separate from the monitoring device, said input corresponding to detection of at least one parameter detected by a corresponding detection device.

2. The method of claim 1, wherein each motivating source is selected from the group consisting of a venturi system, a fan, and an impeller.

3. The method of claim 1, wherein the centralized device is a computer or a security system.

4. The method of claim 1, further comprising measuring an external temperature and communicating measurement of the external temperature to a receiver.

5. The method of claim 1, further comprising configuring the plurality of monitoring devices in a mesh network.

6. The method of claim 1, wherein each at least one parameter is selected from the group consisting of moisture, barometric pressure, volatile organic compounds, electrostatic charge, motion of the roof, motion on the roof, vibration, heat, and off gases generated from roof material decay.

7. The method of claim 6, wherein the power supply is selected from the group consisting of solar, wind, battery, or hard wires to an electric grid.

8. The method of claim 6, wherein the motivating source is selected from the group consisting of a venturi system, a fan, and an impeller.

9. The method of claim 6, wherein the centralized device is a computer or a security system.

10. The method of claim 6, further comprising measuring an external temperature and communicating measurement of the external temperature to a receiver.

11. The method of claim 6, wherein the plurality of monitoring devices are configured in a mesh network.

12. The method of claim 1, wherein each power supply is selected from the group consisting of solar, wind, battery, or hard wires to an electric grid.

13. The method of claim 12, wherein the motivating source is selected from the group consisting of a venturi system, a fan, and an impeller.

14. The method of claim 12, wherein the centralized device is a computer or a security system.

15. The method of claim 12, further comprising measuring an external temperature and communicating measurement of the external temperature to a receiver.

16. The method of claim 12, wherein the plurality of monitoring devices are configured in a mesh network.

17. The method of claim 1, further comprising logging data from the plurality of monitoring devices using the centralized device.

18. The method of claim 17, identifying triggering events from the logged data using the centralized device.

19. The method of claim 17, further comprising identifying a concentration of moisture increasing over time based on the logged data.

20. The method of claim 17, identifying a leak location in the roof based on the logged data.

* * * * *